(12) United States Patent
Friedli et al.

(10) Patent No.: US 7,319,968 B2
(45) Date of Patent: *Jan. 15, 2008

(54) PROCEDURES, SYSTEM AND COMPUTER PROGRAM PRODUCT FOR THE PRESENTATION OF MULTIMEDIA CONTENTS IN ELEVATOR INSTALLATIONS

(75) Inventors: Paul Friedli, Remetschwil (CH); Thomas Meyer, Rotkreuz (CH)

(73) Assignee: Inventio AG, Hergiswil NW (CH)

( * ) Notice: Subject to any disclaimer, the term of this patent is extended or adjusted under 35 U.S.C. 154(b) by 216 days.

This patent is subject to a terminal disclaimer.

(21) Appl. No.: 10/368,836

(22) Filed: Feb. 19, 2003

(65) Prior Publication Data

US 2003/0177097 A1    Sep. 18, 2003

(30) Foreign Application Priority Data

Mar. 1, 2002   (EP) .................................. 02405157

(51) Int. Cl.
*G06Q 99/00* (2006.01)

(52) U.S. Cl. .......................... 705/1; 187/391; 187/392; 187/396; 187/388; 705/14

(58) Field of Classification Search .................... 705/1, 705/15; 187/391–392, 396; 704/231, 236, 704/243
See application file for complete search history.

(56) References Cited

U.S. PATENT DOCUMENTS 5,606,154 A    2/1997 Doigan et al.
5,923,252 A    7/1999 Sizer et al.
6,288,688 B1   9/2001 Hughes et al.
6,341,668 B1 * 1/2002 Fayette et al. ............... 187/391
6,349,797 B1   2/2002 Newville et al.
6,615,175 B1 * 9/2003 Gazdzinski ................... 704/275
7,000,735 B2 * 2/2006 Meyer ......................... 187/391
2002/0013144 A1 * 1/2002 Waters et al. ................ 455/414

FOREIGN PATENT DOCUMENTS

| JP | 05319715 | 12/1993 |
| JP | 08108981 A * | 4/1996 |
| WO | WO 00/59818 | 10/2000 |
| WO | WO 01/44095 A1 | 6/2001 |
| WO | WO 01/61612 | 8/2001 |

OTHER PUBLICATIONS

Proquest article, Business World Special Features: Elevators: Otis line Boasts of more value added features; Feb. 28, 2001.*
Allen, C. et al., "Internet World Guide to one-to-one Web Marketing", 1998, Internet World, Mecklermedia, Westport, CT, pp. 235-165.

* cited by examiner

*Primary Examiner*—John G Weiss
*Assistant Examiner*—Traci L. Casler
(74) *Attorney, Agent, or Firm*—Fraser Clemens Martin & Miller LLC; William J. Clemens

(57) ABSTRACT

A method, a system and a computer program product presents multimedia contents in elevator installations. At least one individual user profile with multimedia contents is stored for each elevator user. When a user is identified, the multimedia contents in the associated user profile are presented. The user manages his or her own multimedia contents in the associated user profile.

21 Claims, 3 Drawing Sheets

PROCEDURES, SYSTEM AND COMPUTER PROGRAM PRODUCT FOR THE PRESENTATION OF MULTIMEDIA CONTENTS IN ELEVATOR INSTALLATIONS

BACKGROUND OF THE INVENTION

The present invention relates to a procedure, a system and a computer program product for the presentation of multimedia contents in elevator installations.

The U.S. Pat. No. 6,288,688 shows a computer-aided system for the distribution and display of digital advertisement (short messages) within elevator cars. Screens are installed in the elevator cars and such screens are connected with a monitoring unit by means of communication connections. The monitoring unit has a data storage device with digital advertisement. The digital advertisement being individually addressed is dispatched to the screens.

By multimedia is understood the integration of different media into a device. Multimedia contents consist of music compositions, SMS (Short Message service), EMS (Enhanced Messaging service), MMS (Multimedia Messaging service), texts, pictures, videos, movies, but also of scents, lighting effects, etc. Multimedia contents can be presented by means of computers through input and output devices such as screens, loudspeakers, keyboards, microphones, atomizers, lamps, etc.

A task of the present invention is to provide a procedure, a system and a computer program product in order to offer multimedia contents in elevator installations. In particular, individually tailor-made multimedia contents based on the user of the elevator installation are presented.

SUMMARY OF THE INVENTION

The present invention concerns a method for the presentation of multimedia contents in elevator installations comprising the steps of: a) storing for each of a plurality of users of an elevator installation at least one individual user proflic with multimedia contents; b) identifying each of the users at the elevator installation; c) presenting multimedia contents carried within the individual user profile associated with an identified user of the plurality of users; and d) providing a device at the elevator installation for each of the users to manage the multimedia contents of the associated at least one individual user profile.

The present invention also concerns a system for the presentation of multimedia contents in elevator installations comprising: at least one recognition device for recognizing elevator user identification codes; at least one examination device responsive to said at least one recognition device for identifying the recognized identification codes; at least one contents database storing at least one user profile with multimedia contents for each elevator user associated with the identification codes; and at least one device communicating with said contents database for operation by the elevator users for selecting and evaluating the associated user profiles.

The present invention further concerns a computer program product for the presentation of multimedia contents in elevator installations comprising: a comparison means for comparing at least one recognized identification code of an elevator user with a plurality of identification addresses; an allocation means responsive to a positive comparison of said comparison means for allocating the at least one recognized identification code to an identical to one of the plurality of identification addresses; an assignment means responsive to an allocation by said allocation means for assigning a user profile with multimedia contents to the identical one of the plurality of identification addresses; and an input means responsive to signals generated by the elevator user for a repeat order or new order of multimedia contents.

According to the present invention, at least an individualized user profile with multimedia contents is carried for a user. This user profile is customized; i.e. it contains preferential multimedia contents selected by the user. The user profile contains much information; i.e. the user selects preferential multimedia contents from a large offering. The user profile is far-reaching; i.e. the user receives multimedia contents wherever he is identified.

Preferably, the user is identified before, but could be identified after, entering an elevator car. The identification takes place, preferably, via an identification code. An examination device examines the validity of this recognized identification code. With a valid identification code, the user is considered as identified.

An identified user is presented multimedia contents, which contents are carried in the user profile. Preferably, these multimedia contents are loaded from at least one contents database and presented through at least one output device before, or in the elevator car. Multirnodia contents are made available by at least one provider and stored on request in the contents database. Preferably, multimedia contents categorized by demographic travelling preferences, psycho graphics travelling preferences as well as situational travelling preferences are presented.

The user administers his (or her) own user profile. The multimedia contents are scalable; i.e. in the three-dimensional area, which is extended through the dimensions of customization degree, richness of content and range and optimal contents for the user are made available. The user can specify, which contents (what) he temporally (when) and locally (where) and in which form (how and of whom) would like to have presented. Preferably, such a selection and evaluation of the multimedia contents arises through at least one input device. Preferably, the user operates an area on a touch-sensitive screen surface. With positive acceptance, multimedia contents are maintained in the user profile and with negative acceptance, the multimedia contents are removed from the user profile.

The system works well with known and proven means of communication technique and can be added to already installed elevator installations. There are installed at least one recognition device for recognizing an identification code, at least one examination device for identifying a user on the basis of a recognized identification code, at least one contents database for linking at least one user profile with multimedia contents and at least one output device for presenting multimedia contents carried in the user profile.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
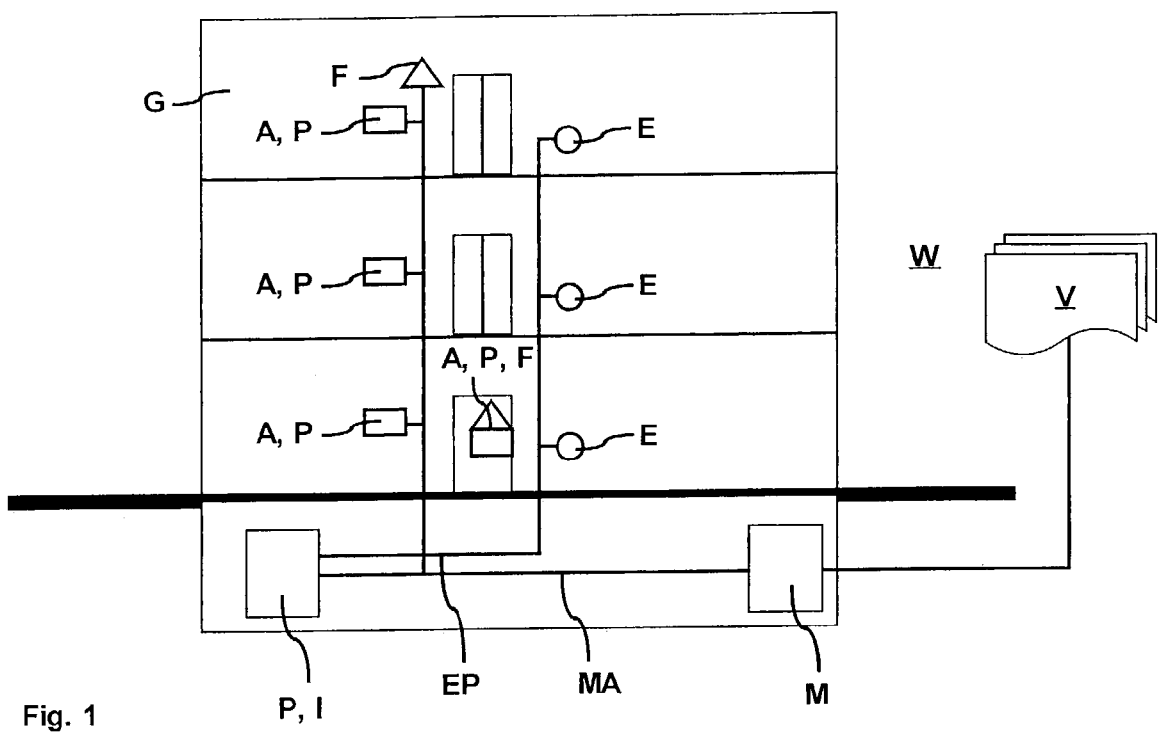
FIG. 1 is a schematic representation of a system according to the present invention for the presentation of multimedia contents in elevator installations.

With respect to the system associated with an elevator installation: FIG. 1 shows schematically an exemplary embodiment form of a system according to the present invention for the presentation of multimedia contents in elevator installations. The system includes at least one recognition device E, at least one examination device P, at least one identification database I, at least one elevator control B, at least one contents database M as well as at least one output device A. The elevator installation is installed in a building G, or a block of buildings, and transports users from a floor to another floor. In accordance with FIG. 1, three floors are represented. The elevator installation is operated for example electrically or hydraulically. Preferably, on each floor there is one of the recognition devices E as well as one of the output devices A installed beside a floor door to the elevator installation. Alternatively, it is also possible to install only one of the recognition devices E, for example on the ground floor of the building. G. Preferably, one of the output devices A is installed in an elevator car of the elevator installation. In accordance with FIG. 1, the elevator car is located at the ground,floor of the building G, and the output device A of the elevator car is recognized through the open elevator doors. In accordance with FIG. 1, the examination device P, the identification database I and the contents database M are located in a basement of the building G and the elevator control B is located on an upper floor of the building G.

Figure 2:
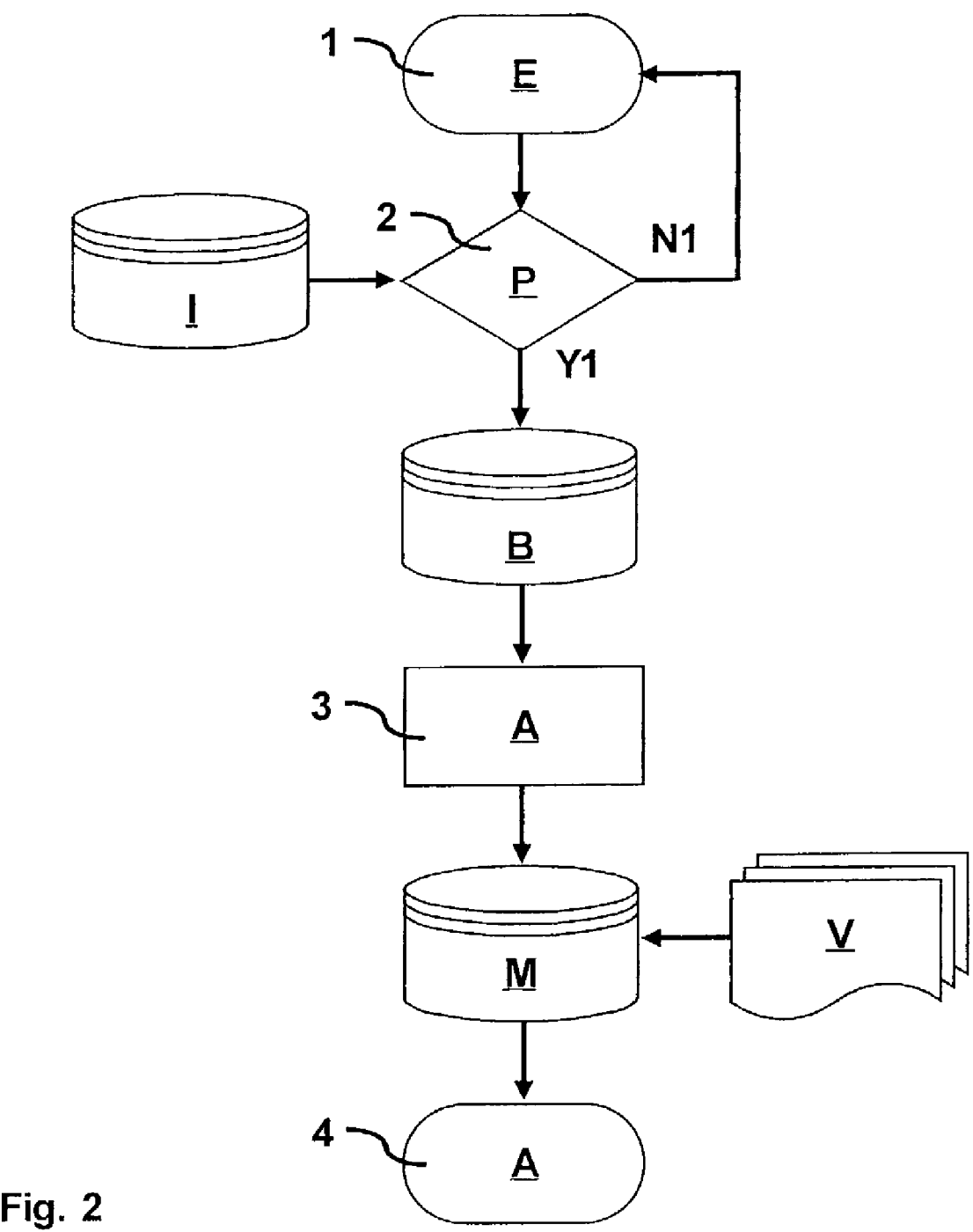
FIG. 2 is a flow diagram of the system of FIG. 1 for the presentation of multimedia contents in elevator installations.

With respect to the identification: FIG. 2 shows an exemplary embodiment of a system for the presentation of multimedia contents. For the presentation of multimedia contents, a user logs onto the system with an identification code. Such a registration 1 takes place, preferably, through the recognition device E for recognizing the identification code. In this connection, several construction forms of the registration 1 can be differentiated:

In a first preferred construction form of the registration 1, the identification code is transmitted by an identification device to the recognition device E. Such contact-less recognition of an identification code is well known from the European patent document EP 699,617. The identification device is here a transponder with a transponder antenna and transmitting electronics. The transmitting electronics of the identification device exhibits a sending unit and a receiving unit and a data storage device with at least one identification code. The identification device is fed by induction through an electromagnetic field with an operating voltage. Preferably, the recognition device E emits such an electromagnetic field. As soon as the identification device is located in the proximity of the recognition device E, it is supplied with energy and it sends the identification code to the recognition device E. For example, the identification device is maintained hereto some centimeters, up to several meters, distance from the recognition device E. The recognition device E receives the identification code through an accordingly developed sending and receiving antenna. Any readable and/or able to be written information devices respectively recognition devices can be realized. So, information devices, which communicate based on light and contactless with a recognition device like a scanner, are likewise applicable. Also applicable are information devices in the form of magnetic cards, electronic chip, etc., which communicate through at least an intermediate contact with a recognition device.

In further construction forms of the registration 1, the identification code is entered by the user mechanically, for example through a keyboard of the recognition device E and/or acoustically, for example through a microphone of the recognition device E. Of course, the man skilled in the art, having knowledge of the present invention, may realize other input devices, respectively output devices such as the output device A with touch-sensitive screen surface, a mobile telephone keyboard, etc.

Finally, it is possible to recognize a biometric identification code of the user, such as a fingerprint, an iris pattern, a face profile, etc. with a recognition device.

With respect to the examination: The recognition device E further transmits the recognized identification code for examination 2 to the examination device P. At least one of the examination devices P is necessary; and several of the examination devices P can be used. The examination device P is computer-aided. Under "computer-aided" is understood a commercially available computing unit such as a PC (Personal Computer) with the operating system Windows, Apple, etc., or respectively a workstation with the operating system UNIX, etc. The identification database I is preferably a relational database such as Access, Lotus Notes, Oracle, SAP, etc. or respectively a XML (Extensible Markup Language) database, etc. The identification database I can be placed into a computer-aided device. The recognition device E, the examination device P and identification database I are equipped with inputs and outputs for communication. Preferably, the communication arises among the recognition device E, the examination device P and identification database I on a recognition bus EP in accordance with a well known standard protocol such as PCI (Peripheral Component Interconnect)—bus, Ethernet, token ring, etc., preferably by radio and/or cable. The examination device P can be developed mobile, or respectively fixed. The examination device P and the identification database I can be integrated, as shown in FIG. 1, into a single housing, but they can also be placed separately in different locations. Of course, it is also possible to realize the recognition device E, the examination device P and the identification database I in a single housing. Furthermore, it is possible to integrate the examination device P and the output devices A, as shown in FIG. 1, into a single housing.

Preferably, a computer program product is installed into the examination device P. The computer program product compares the recognized identification code with identification addresses, which are stored in the identification database I. The user is unequivocally identifiable through an identification address. For each identification address, an identification code exists. For example, an identification address is to be assigned exactly to a recognized identification code, if identification address and identification code are identical. In accordance with FIG. 2, the computer program product supplies then a positive allocation result Y1, if one of the stored identification addresses is identical to the identification code, otherwise the computer program product supplies a negative allocation result N1. Such a negative allocation result is transmitted, for example, to the recognition device E, from which the identification code has been transmitted and the user is called up through the output device A of this recognition device E on a repeated registration 1. By reiterated negative allocation result, a neutral, not individualized guest address can be assigned to the user. The computer program product is written, for example, in a common and proven computer language. For example, the computer program product is stored in a storage unit and is loaded into a processor for the execution of the computer program product.

With respect to the allocation of multimedia contents: Multimedia contents from the contents database M are made available on a call 3 to the user identified accordingly to an identification code. The contents database M is computer-aided. It has inputs and outputs for communication with the examination device P, the output device A and a source of multimedia contents V. Preferably, at least one computer program product is installed in the identification database I and such computer program product assigns to an identification address of the user a user profile with multimedia contents, which are stored into the contents database M. Multimedia contents consist of music compositions, SMS, EMS, MMS, texts, pictures videos, movies, scents, lighting effects, etc. It applies also here that the computer program product can be written in a common and proven computer language. For example, the computer program product is stored in a storage unit and is loaded into a processor for the execution of the computer program product.

With respect to the transmission of multimedia contents: The multimedia contents conforming to an identification address are presented in a presentation 4 on the output device A before or in the elevator car. The contents database M and the output device A communicate, preferably, on a contents bus MA in accordance with a well known standard protocol such as PCI-Bus, Ethernet, token ring, etc., by cables and/or by radio. Of course, it is also possible to transmit multimedia contents by mail, for example stored on a CD (Compact disk).

Figure 3:
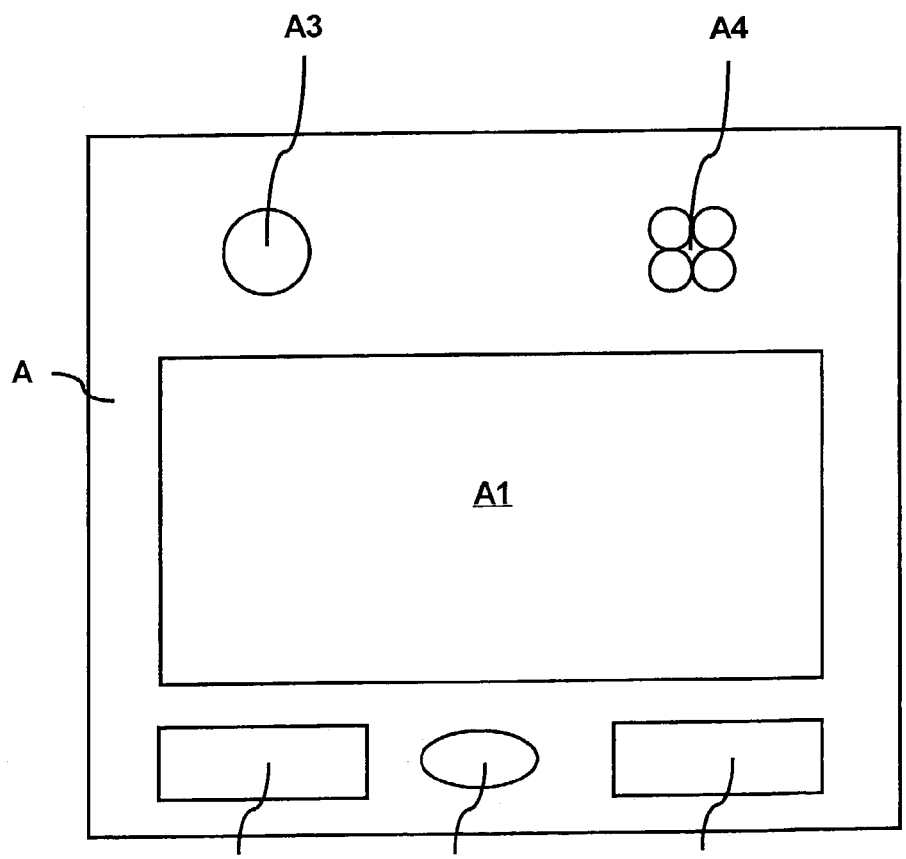
FIG. 3 is a schematic representation of an output device for the system shown in FIGS. 1 and 2.

In accordance with FIG. 1, the output devices A communicate from the floors by cables with the contents database M, while the output device A in the elevator car communicates by radio through a transmitter F and by cables with the contents database M. The output device A is for example, accordingly with FIG. 3, a panel with several areas A1, A2, A3, A4, A5 and A6. For example, it concerns, in the case of the output device A, a computer-aided screen with first, second, third and fourth ranges A1, A2, A3 and A4 respectively for the output of multimedia contents, and with fifth and sixth ranges A5 and A6 respectively for communication with the contents database M. The communication is preferably bi-directional. The output device A receives multimedia contents from the contents database M and displays them in the first area A1 as a graphical representation, in the second area A2 as an acoustical representation, in the third range A3 as an aromatic representation, and in the fourth range A4 as an optical representation. For example, the first area A1 is a screen, the second area A2 is a loudspeaker, the third area A3 is a scent machine and the fourth area A4 is a generator. By scent machine is understood a spray apparatus with a fragrance, or several, freely selectable and mixable fragrances and such spray apparatus sprays this/these fragrance/fragrances. By generator is understood at least a controllable, and/or adjustable lamp and such lamp emits effects lighting.

Preferably, the output device A transmits signals to the contents database M and to the examination device P. For example, the fifth and sixth areas A5 and A6 are touch-sensitive and enable the generation of such signals by the user. With such signals a user can, for example, select and confirm multimedia contents. For confirming multimedia contents the user operates the fifth area A5 and for selecting multimedia contents the user operates the sixth area A6. So long as a user does not actively select multimedia contents, multimedia contents apply as desired. Of course, also other means for the generation of such signals are applicable such as a microphone coupled with speech recognition for receiving language instructions. The man skilled in the art has in this connection, having knowledge of the present invention, multiple possibilities.

Preferably, at least one computer program product is installed in the identification database I, and such computer program product transmits multimedia contents of a user profile as at least one cookie to an output device A. By cookie is understood a file, which exhibits a sequence of multimedia contents, which is presented in a certain order. For example, a cookie consists of a sequence of ten sides, which is presented in a sequence page 1 through page 10. For example, it concerns thereby a sequel history, which is presented to a user by successive transportations in the elevator. The cookie notes the current stage of the sequence, so that after, for example, the presentation of the pages 1 and 2, with a following transport, the page 3 is presented. Preferably, such a cookie can be stored in a data. storage unit of the output device A. Preferably, the identification database I transmits the cookie directly to the one of the output devices A, in whose proximity the user is. For this purpose, the output device A receives, for example, a piece of information from the elevator control B that a user identified with an identification code is in its proximity. The output device A announces itself, thereupon, to the identification database I. For example, the output device A transmits the identification address of the identified user to the identification database I. The computer program product assigns a user profile with multimedia contents to this identification address and transmits multimedia contents of this user profile to this output device A. The computer program product is written, for example, in a common and proven computer language. For example, the computer program product is stored into a storage unit and is loaded into a processor for the execution of the computer program product.

With respect to the structure of multimedia contents: A system architect presents multimedia contents, preferably, in a structure. The structure covers a framework, for example a sequence of pages, respectively columns in pages and in such framework multimedia contents are introduced. In a favorable embodiment form, multimedia contents are structured as Flash film with a software named Flash of the company Macromedia. The software Flash permits the simple and rapid provision of appealing designs, unusual animations, which are provided with music. Other software such as HTML (Hypertext Markup LANGUAGE) can, of course, also be used.

Multimedia contents are categorized. The system architect offers a multiplicity of categorized multimedia contents to the user in his user profile. Such categories are subdivided, preferably, into travelling preferences such as demographic travelling preferences, psychographics travelling preferences, as well as situational travelling preferences.

Demographic Travelling Preferences are for Example:

The language presentation (for example: DE, GB, FR, IT, etc.)

The sex of the user (male/female)

The age of the user (for example: subdivided into age groups of 0-13, 14-20, 21-30, 31-40, 41-50, 51-65, 66-80, 81-120 years)

Civil status (for example: single, married, divorced, widowed)

Income (for example: subdivided into income classes of 0-30,000, 30,001-60,000, 60,001-90,000, 90,001-120,000, 120,001-180,000, >180,000 CHF/per year)

Psychographics travelling preferences are for example:

Information preferences (for example: weather forecast, horoscope, stock exchange briefing, sport news, topicalities, local news, etc.)

Culture preferences (for example: Italian meal, Chinese meal, wine, cigars, etc.)

Music preferences (for example: pop-music, classical music, jazz music, etc.)

Scent preferences (for example: lavender, peppermint, eucalyptus, etc.)

Light preferences (for example: violent lightning, mat warm light, etc.)

Situational Travelling Preferences are for Example:

Zone preferences (for example: pre-determined zones, floors of a building G)

Period preferences (for example: pre-determined periods (in the morning, in the afternoon, at night), clock times (coffee break, lunch break), etc.)

Preferably, a computer program product is provided, which categorises multimedia contents for a user profile. The computer program product is written, for example, in a common and proven computer language. For example, the computer program product is stored in a storage unit and is loaded into a processor for the execution of the computer program product. Each category has at least one specific multimedia content. Preferably, each category exhibits several specific multimedia contents. For example, the category "information preferences" exhibits specific multimedia contents such as "weather forecast, horoscope, stock exchange briefing, sport news, topicalities, local news, etc.". The different categories are linkable one to each other, in accordance with at least a logical element such as "AND", "OR", "NOT". For example, a psychographics promotion preference can be modulated through a situational promotion preference, for example, by adapting the "information preferences" with the "period preferences", in such a manner that, in the morning the weather forecast, at noon the stock exchange briefing and in the evening the topicalities are presented. Multimedia contents are thus scalable, i.e. in the three-dimensional space, which is extended through the dimensions of degree of customisation, richness of content and range, and a structure with specific multimedia contents is made available to the user and such multimedia contents constitute for the user a valuable, optimal content.

With regard to the procurement of multimedia contents: Multimedia contents V are obtained, preferably, by a provider W (FIG. 1). Preferably, the contents database M communicates with the provider W by means of communication tools such as the Internet and over established standard protocols such as TCP/IP (Transmission Control Protocol/Internet Protocol), FTP (File Transfer Protocol), etc. The contents database M works, preferably, with a software based upon the Open Services Gateway initiative (OSGi) specification. OSGi has set a much-considered open standard, whereby the update, respectively upgrade possibilities of the multimedia contents V by the provider W enable topicality and a high level of customization. The multimedia contents V are provided, preferably with a purchase order form, by the provider W. Preferably, a computer program product is provided that lists the multimedia contents to be updated and that for the entire contents database M and per actualization interval of the provider W. The computer program product is written, for example, in a common and proven computer language. For example, the computer program product is stored in a storage unit and is loaded into a processor for the execution of the computer program product. The actualization intervals can vary depending upon category, for example the horoscope is updated every 24 hours, the weather forecast is updated every 12 hours, while the stock exchange briefing is updated every 2 minutes. Representative actualization intervals are every 24 hours, and/or every 8 hours, and/or every 2 hours, and/or every 60 minutes, and/or every 15 minutes, and/or every 2 minutes, and/or every 60 seconds, and/or every 15 seconds.

Figure 4:
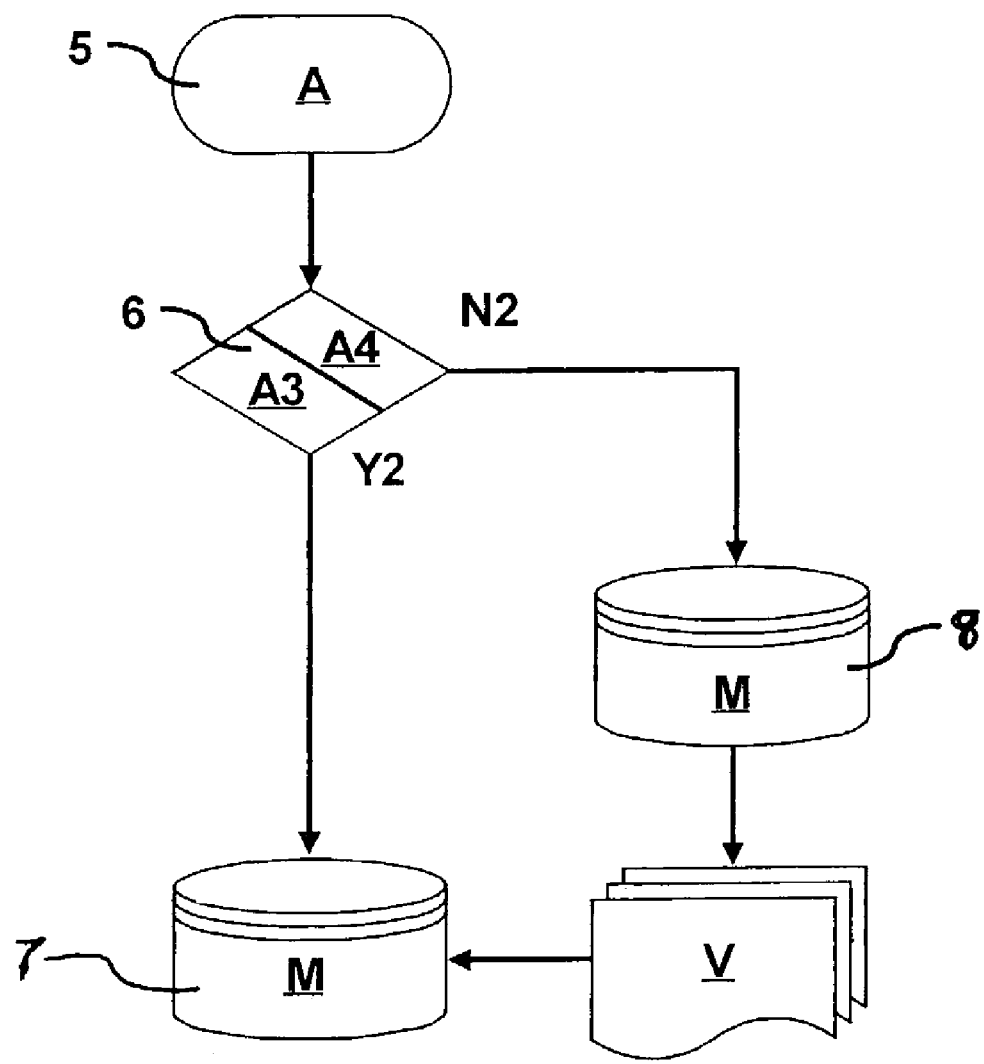
FIG. 4 is a flow diagram of a group specific adjustment of multimedia contents for the system shown in FIG. 1.

With respect to the management of multimedia contents: FIG. 4 shows a basic representation of a method of management of the multimedia contents of the contents database M. The user manages his (or her) own user profile. The advantage of such self-management is the rapid, direct, uncomplicated and intuitive realization of this self-management. This self-management is rapid and direct, because the user enters the changes directly and immediately while obtaining multimedia contents at the output device A. This self-management is uncomplicated and intuitive, because the user operates a self-describing area on the output device A and does not necessitate any further devices such as a separate input device. For example, multimedia contents are offered to the user on the output device A in a presentation 5 and the user evaluates such multimedia contents. For the management 6, the user selects, preferably, by categories between different multimedia contents. For example, the user operates for this the fifth and/or sixth areas A5 and A6 on a touch-sensitive screen surface of the output device A in accordance with FIG. 3. With a positive acceptance Y2, specific multimedia content of this category is maintained in the user profile. With a negative acceptance N2 (rejection), specific multimedia content of this category is removed from the user profile and replaced by another specific multimedia content of this category. For example, with the positive acceptance Y2, a repeat order 7 of the specific multimedia content to be maintained takes place, while with the negative acceptance N2, a new order 8 of another specific multimedia content of the category takes place. For example, with a negative acceptance of the multimedia content "pop music" another music preference such as "jazz music" is presented, etc.

The management 6 of multimedia contents takes place intuitively, preferably, through the user. For the repeat order 7, the user touches, for example, the third area A3 on the output device A; for the new order 8 the user touches, for example, the sixth area A6 on the output device A. These fifth and sixth areas A5 and A6 differ themselves, for example, through logos such as a laughing face for a repeat order 7 and a crying face for a new order 8. The touch-sensitive areas A5 and A6 generate signals, which signals are transmitted to the contents database M. The contents database M carries out, in accordance with these signals, the repeat order 7 or the new order 8 of specific multimedia contents. During the next update of multimedia contents V via the provider W, reordered or newly ordered multimedia contents are offered to the user. Preferably, a computer program product is provided and such computer program product reorders or newly orders the multimedia contents of the user profile in accordance with signals for the repeat order 7 or the new order 8. The computer program product is, for example, written in a common and proven computer language. For example, the computer program product is stored in a storage unit and is loaded into a processor for the execution of the computer program product.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for the presentation of multimedia contents in elevator installations comprising the steps of:
   a. pre-setting an elevator installation and storing for each of a plurality of users at least one user-managed individual user profile with multimedia contents of the associated user in the elevator installation, the at least one user-managed individual user profile being unique to the individual associated user;
   b. operating the elevator installation to identify each of the users at the elevator installation;
   c. presenting through the elevator installation multimedia contents carried within the pre-set individual user profile associated with an identified elevator user of the plurality of users;
   d. providing a device at the elevator installation for each of the users to manage the multimedia contents of the associated at least one pre-set individual user profile; and
   e. evaluating preferences common to said plurality of users wherein the multimedia contents associated with each of the users represent the preferences of that user.

2. The method according to claim 1 including categorizing the multimedia contents of the individual user profiles.

3. The method according to claim 2 including categorizing the multimedia contents in accordance with at least one of a demographic travelling preference, a psychographics travelling preference, and a situational travelling preference.

4. The method according to claim 1 wherein said step a. includes ordering a specific multimedia contents and storing the specific multimedia contents associated with the at least one pre-set user proflic and when a user generates a positive acceptance at the device, the specific multimedia contents previously ordered is reordered.

5. The method according to claim 4 including reordering the specific multimedia contents from provider of multimedia contents.

6. The method according to claim 1 wherein when a user generates a negative acceptance at the device, a specific multimedia contents is newly ordered.

7. The method according to claim 6 including newly ordering the specific multimedia contents from a provider of multimedia contents.

8. The method according to claim 1 wherein said step c. is preformed by selecting and evaluating the multimedia contents of the individual user profiles through the device.

9. A system for the presentation of multimedia contents in elevator installations comprising:
   at least one recognition device for recognizing elevator user identification codes;
   at least one examination device responsive to said at least one recognition device for identifying the recognized identification codes;
   at least one identification database storing at least one user-managed user profile with multimedia contents for each elevator user associated with the identification codes, forming a pre-set user profile unique to the individual associated user; and
   at least one device communicating with said identification database for sequentially transmitting said multimedia contents of said associated elevator user and providing for operation by the elevator users for selecting and evaluating the associated pre-set user profiles.

10. The system according to claim 9 including at least one output device for presenting the multimedia contents of the user profiles to the associated users, said at least one output device having an area for selecting the associated user profiles.

11. The system according to claim 9 including at least one output device for presenting the multimedia contents of the user profiles to the associated users, said at least one output device having an area for evaluating the associated user profiles.

12. A computer program product for the presentation of multimedia contents in elevator installations comprising:
   a comparison means in the elevator installation for comparing at least one recognized identification code of an elevator user with a plurality of identification addresses;
   an allocation means in the elevator installation responsive to a positive comparison of said comparison means for allocating the at least one recognized identification code to an identical to one of the plurality of identification addresses;
   an assignment means in the elevator installation responsive to an allocation by said allocation means for assigning a user-managed user profile with multimedia contents to the identical one of the plurality of identification addresses, wherein said user-managed profile is established and pre-set for each individual user within said elevator installation; and
   an input means in the elevator installation responsive to signals generated by the associated elevator user for modifying by negating or confirming said multimedia contents through a repeat order or new order of multimedia contents.

13. The computer program product according to claim 12 including a categorizing means for categorizing the multimedia contents within each of the user profiles in accordance with at least one promotion preference of the associated elevator user.

14. The computer program product according to claim 12 including an ordering means responsive to the signals for generating a repeat order or new order of multimedia contents to a provider of multimedia contents.

15. A method for the presentation of multimedia contents in elevator installations comprising the steps of:
   a. pre-setting an elevator installation and storing for each of a plurality of users at least one user-managed individual user profile with multimedia contents in the elevator installation;
   b. operating the elevator installation to identify each of the users at the elevator installation;
   c. presenting through the elevator installation multimedia contents carried within the pre-set individual user profile associated with an identified user of the plurality of users; and
   d. providing a device at the elevator installation for each of the users, to manage the multimedia contents of the associated at least one pre-set individual user profile, wherein step a. includes ordering a specific multimedia contents and storing the specific multimedia contents associated with the at least one pre-set user profile and when a user generates a positive acceptance at the device, the specific multimedia contents previously ordered is reordered.

16. The method according to claim 15 including reordering the specific multimedia contents from a provider of multimedia contents.

17. The method according to claim 15 including categorizing the multimedia contents of the individual user profiles.

18. The method according to claim 17 including categorizing the multimedia contents in accordance with at least one of a demographic travelling preference, a psychographics travelling preference, and a situational travelling preference.

19. The method according to claim 15 wherein said step c. is performed by selecting and evaluating the multimedia contents of the individual user profiles through the device.

20. A computer program product for the presentation of multimedia contents in elevator installations comprising:

a comparison means in the elevator installation for comparing at least one recognized identification code of an elevator user with a plurality of identification addresses;

an allocation means in the elevator installation responsive to a positive comparison of said comparison means for allocating the at least one recognized identification code to an identical to one of the plurality of identification addresses;

an assignment means m the elevator installation responsive to an allocation by said allocation means for assigning a user-managed user profile with multimedia contents to the identical one of the plurality of identification addresses, wherein said user-managed profile is established and pre-set for each individual user within said elevator installation;

an input means in the elevator installation responsive to signals generated by the elevator user for a repeat order or new order of multimedia contents; and a categorizing means for categorizing the multimedia contents within each of the user profiles in accordance with at least one promotion preference of the associated elevator user.

21. A computer program product for the presentation of multimedia contents in elevator installations comprising:

a comparison means in the elevator installation for comparing at least one recognized identification code of an elevator user with a plurality of identification addresses;

an allocation means in the elevator installation responsive to a positive comparison of said comparison means for allocating the at least one recognized identification code to an identical to one of the plurality of identification addresses;

an assignment means in the elevator installation responsive to an allocation by said allocation means for assigning a user-managed user profile with multimedia contents to the identical one of the plurality of identification addresses, wherein said user-managed profile is established and pre-set for each individual user within said elevator installation;

an input means in the elevator installation responsive to signals generated by the elevator user for a repeat order or new order of multimedia contents; and an ordering means responsive to the signals for generating a repeat order or new order of multimedia contents to a provider of multimedia contents.

* * * * *